United States Patent
Hiscock

(10) Patent No.: US 9,048,938 B2
(45) Date of Patent: **\*Jun. 2, 2015**

(54) CHIRP COMMUNICATIONS

(75) Inventor: Paul Dominic Hiscock, Cambridge (GB)

(73) Assignee: CAMBRIDGE SILICON RADIO LIMITED, Cambridge (GB)

(\*) Notice: Subject to any disclaimer, the term of this patent is extended or adjusted under 35 U.S.C. 154(b) by 325 days.

This patent is subject to a terminal disclaimer.

(21) Appl. No.: 13/451,505

(22) Filed: Apr. 19, 2012

(65) Prior Publication Data

US 2012/0269233 A1 Oct. 25, 2012

(30) Foreign Application Priority Data

Apr. 19, 2011 (GB) .................................. 1106609.9

(51) Int. Cl.
*H04B 1/00* (2006.01)
*H04B 1/713* (2011.01)

(52) U.S. Cl.
CPC ........................................ *H04B 1/713* (2013.01)

(58) Field of Classification Search
CPC .. H04B 2001/6912; H04B 1/69; H04B 1/707; H04B 1/713; H04B 1/7174
USPC .................................. 375/130–153
See application file for complete search history.

(56) References Cited

U.S. PATENT DOCUMENTS

| | | | | |
|---|---|---|---|---|
| 5,424,631 A * | 6/1995 | Ward | .......................... | 324/76.19 |
| 5,657,022 A * | 8/1997 | Van Etten et al. | ............. | 342/104 |
| 5,850,390 A * | 12/1998 | Ramel | ............................ | 370/330 |
| 6,304,619 B1 * | 10/2001 | Citta et al. | ..................... | 375/343 |
| 6,418,158 B1 * | 7/2002 | Vishwanath et al. | ......... | 375/139 |
| 6,498,822 B1 * | 12/2002 | Tanaka | ........................... | 375/354 |
| 6,677,895 B1 * | 1/2004 | Holt | ......................... | 342/357.31 |
| 7,068,704 B1 * | 6/2006 | Orr | ................................ | 375/139 |
| 7,194,019 B2 * | 3/2007 | Dowla et al. | .................. | 375/147 |
| 8,121,172 B1 * | 2/2012 | Whelan et al. | ................. | 375/139 |
| 8,175,134 B1 * | 5/2012 | Giallorenzi et al. | .......... | 375/140 |
| 8,295,393 B2 * | 10/2012 | Watanabe et al. | ............. | 375/296 |
| 8,400,349 B1 * | 3/2013 | Dubbert et al. | ............... | 342/113 |
| 8,406,275 B2 * | 3/2013 | Sforza | ........................... | 375/139 |
| 8,675,710 B2 * | 3/2014 | Hiscock | ........................ | 375/139 |
| 2001/0055352 A1 * | 12/2001 | Bannasch et al. | ............. | 375/348 |
| 2002/0009125 A1 * | 1/2002 | Shi | ................................ | 375/139 |
| 2008/0137717 A1 * | 6/2008 | Lee | ................................ | 375/139 |
| 2008/0165833 A1 * | 7/2008 | Lee | ................................ | 375/139 |
| 2008/0310481 A1 * | 12/2008 | Schaffner | ...................... | 375/139 |

\* cited by examiner

*Primary Examiner* — Sam K Ahn
*Assistant Examiner* — James M Perez
(74) *Attorney, Agent, or Firm* — Pillsbury Winthrop Shaw Pittman LLP

(57) ABSTRACT

A method for receiving chirp signals at a receiver device according to a protocol in which each chirp signal has a gradient known to the receiver device, the method comprising: receiving a chirp signal having a first gradient g; generating a reference chirp signal having a second gradient g', wherein the second gradient g' differs from the first gradient g by a fixed value v; multiplying the reference chirp signal and the received chirp signal so as to form a mixed chirp signal; and detecting the received chirp signal by correlating the mixed chirp signal with a fixed gradient correlating chirp signal.

18 Claims, 5 Drawing Sheets

CHIRP COMMUNICATIONS

CROSS-REFERENCE TO RELATED APPLICATIONS

The present application claims priority to GB 1106609.9 filed Apr. 19, 2011, the contents of which are incorporated herein by reference in their entirety.

FIELD OF THE INVENTION

The present disclosure relates to chirp communications, and in particular to receiving chirp signals at a receiver device.

BACKGROUND OF THE INVENTION

The chirp modulation method is a modulation method in which the frequency of a signal (chirp) varies linearly over time in a bandwidth of Fs Hz. A chirp having a positive gradient in the frequency-time plane is generally referred to as an up-chirp, for example chirp 1 and chirp 2 on FIG. 1. A chirp having a negative gradient in the frequency-time plane is generally referred to as a down-chirp, for example chirp 3 on FIG. 1.

A chirp can be represented by a sequence of N samples. One or more identical contiguous chirps can form a symbol that represents a data value to be communicated. A chirp can be represented mathematically as:

$$C(g,p) = e^{j\pi g(n-fn(p))(n+1-fn(p))/N} \quad \text{(equation 1)}$$

where g is the gradient of the chirp, N is the number of samples in the sequence, n is a sample in the sequence, p is the symbol's value, fn(p) is a function that encodes p onto the received chirp, which implicitly may also be a function of g, n, N and other constants, and C is the received chirp sequence, which is normally evaluated for all integer values of n from 0 to N-1 in order. The number of valid values of p is the symbol set size, which is nominally N. However, the symbol set size can be more or less than N depending on the quality of the link. The value of g can have any value greater than 0 and less than N. Preferably, g is an integer between 1 and N-1. Due to the modular nature of this expression negative gradients are obtained from N-1 backwards. Hence, N-2 is equivalent to a negative gradient of -2. Where there are more than one identical contiguous chirps in a symbol, each chirp individually conveys the same value which is the symbol value of the symbol.

Chirp 1 in FIG. 1 has a starting frequency of -Fs/2 and a gradient of 1. It increases linearly in frequency over a period of N samples at a sample rate of Fs to reach a frequency close to +Fs/2. Since this is a complex sampled system +Fs/2 is the same as -Fs/2. Multiple chirps are usually contiguous but may start with a different frequency. The signal phase is typically made continuous throughout a sequence of chirps. In other words, after the signal has reached +Fs/2 at n=N-1, the next symbol starts with n=0 again. FIG. 1 illustrates an example in which two consecutive chirps have the same symbol value, whereas the third chirp is different. An apparent discontinuity in frequency between chirp 1 and chirp 2 occurs at n=N.

Chirp 4 in FIG. 2 has a gradient of 2 and a starting frequency of -Fs/2. Because it has double the gradient of the chirps of FIG. 1, it increases linearly in frequency to +Fs/2 in half the number of samples that the chirps in FIG. 1 do, i.e. it reaches close to +Fs/2 after close to N/2 samples. The chirp then wraps around in frequency. Since this is a sampled system, these frequency wraps are in effect continuous and have continuous phase. The chirp repeats the frequency sweep from -Fs/2 to +Fs/2 between samples N/2 and N.

The chirps also have continuous frequency and phase from one end of the chirp to the other. A cyclic shift of the samples that make up a chirp creates another valid chirp.

In a typical receiver configured to receive chirp signals, one or more correlators are used to correlate the received chirp with reference correlating chirps. The received chirp correlates strongly with a reference correlating chirp having the same gradient and symbol value, and weakly with all other chirps. Typically, the expected gradient of a received chirp is known to the receiver. For example, the receiver may be expecting a known sequence of chirps with known gradients as part of a synchronisation process.

In a conventional chirp receiver where the gradient of a received chirp signal is known to the receiver, a programmable correlator is used to correlate the received chirp with the expected reference correlating chirp. The reference and received chirp each comprise N samples, which could be in the order of hundreds or thousands of samples. The reference correlating chirp is regenerated and reloaded into the programmable correlator's internal registers every time there is a change in the chirp signal's gradient, which could be every chirp. This requires a lot of additional cycles in generating and programming the correlator, with an adverse affect on power consumption. Since the reference must be correlated against the received chirp in all N circularly shifted positions, it must work quickly to be useful in a real time system. In a typical low power solution, the correlator comprises a dedicated multiplier for every value in the correlator reference. Since both inputs to each multiplier are unknown to the hardware synthesis tool when the gates are created, a full multiplier must be instantiated, which could amount to many thousands of silicon gates. Each of the N multipliers are typically used N times for each received chirp. Hence, there is an N-squared impact on the power consumption. Hence, this solution is expensive in silicon area and uses a lot of power. This is particularly problematic if the receiver is battery powered.

Thus, there is a need for an improved method of receiving chirp signals having gradients known to the receiver, which requires fewer silicon gates and uses less power than a programmable correlator which holds the reference chirp using internal registers.

SUMMARY OF THE INVENTION

According to a first aspect, there is provided a method for receiving chirp signals at a receiver device according to a protocol in which each chirp signal has a gradient known to the receiver device, the method comprising: receiving a chirp signal having a first gradient g; generating a reference chirp signal having a second gradient g', wherein the second gradient g' differs from the first gradient g by a fixed value v; multiplying the reference chirp signal and the received chirp signal so as to form a mixed chirp signal; and detecting the received chirp signal by correlating the mixed chirp signal with a fixed gradient correlating chirp signal having a third gradient v.

Suitably, the detecting step comprises cyclically correlating the mixed chirp signal with a fixed gradient correlating chirp signal.

Suitably, the detecting step further comprises identifying the correlation peak position.

Suitably, g'=g-1 and the fixed gradient correlating chirp signal has a gradient of 1.

Suitably, a symbol comprises one or more identical chirp signals, wherein each chirp signal is represented by sequence of N samples.

Suitably, N is a prime number.

Suitably, g' is an even number and v is an even number.

Suitably, the reference chirp signal is real and not complex.

Suitably, the mixed chirp signal is real and not complex.

Suitably, each chirp signal comprises one or more chirps, wherein the detecting step comprises correlating a fixed gradient correlating chirp of the fixed gradient correlating chirp signal with each of N cyclic phases of a mixed chirp of the mixed chirp signal, each consecutive cyclic phase of the mixed chirp cyclically shifted by one sample of the sequence of N samples.

Suitably, each chirp signal comprises one or more chirps, wherein the detecting step comprises correlating a fixed gradient correlating chirp of the fixed gradient correlating chirp signal with each of fewer than N cyclic phases of a mixed chirp of the mixed chirp signal, each consecutive cyclic phase of the mixed chirp cyclically shifted by one or more than one sample of the sequence of N samples.

Suitably, detecting the received chirp signal comprises detecting data encoded in the symbol as a value p.

Suitably, the correlation peak position is linearly mapped to symbol value p.

Suitably, the symbol value p is integer.

Alternatively, the symbol value p is fractional.

Suitably, each chirp signal comprises one or more chirps, a chirp of the received chirp signal occupying a time frame known to the receiver device, wherein the detecting step comprises correlating a mixed chirp of the mixed chirp signal occupying the known time frame with each of: a fixed gradient correlating chirp of the fixed gradient correlating chirp signal occupying the known time frame, a fixed gradient correlating chirp of the fixed gradient correlating chirp signal occupying a time frame preceding that of the known time frame, and a fixed gradient correlating chirp of the fixed gradient correlating chirp signal occupying a time frame after that of the known time frame.

Suitably, the method further comprises performing a least squares analysis on the correlations of the detecting step in order to calibrate the time frame known to the receiver device of a chirp in the received chirp signal.

Suitably, each chirp signal comprises a plurality of chirps, each chirp occupying a time frame known to the receiver device, the method further comprising integrating the correlator outputs of each of the plurality of chirps.

According to a second aspect, there is provided a receiver device for receiving chirp signals according to a protocol in which each chirp signal has a gradient known to the receiver device, the receiver device comprising: a receiver configured to receive a chirp signal having a first gradient g; a chirp generator configured to generate a reference chirp signal having a second gradient g', wherein the second gradient g' differs from the first gradient g by a fixed value v; a chirp multiplier configured to multiply the reference chirp signal and the received chirp signal so as to form a mixed chirp signal; and a correlator configured to detect the received chirp signal by correlating the mixed chirp signal with a fixed gradient correlating chirp signal having a third gradient v.

According to a third aspect, there is provided a transceiver device including the receiver device and a transmitter device, wherein the chirp generator is further configured to generate a chirp signal to be transmitted.

BRIEF DESCRIPTION OF THE DRAWINGS

The following disclosure will now be described by way of example with reference to the accompanying drawings. In the drawings.

DETAILED DESCRIPTION

Figure 1:
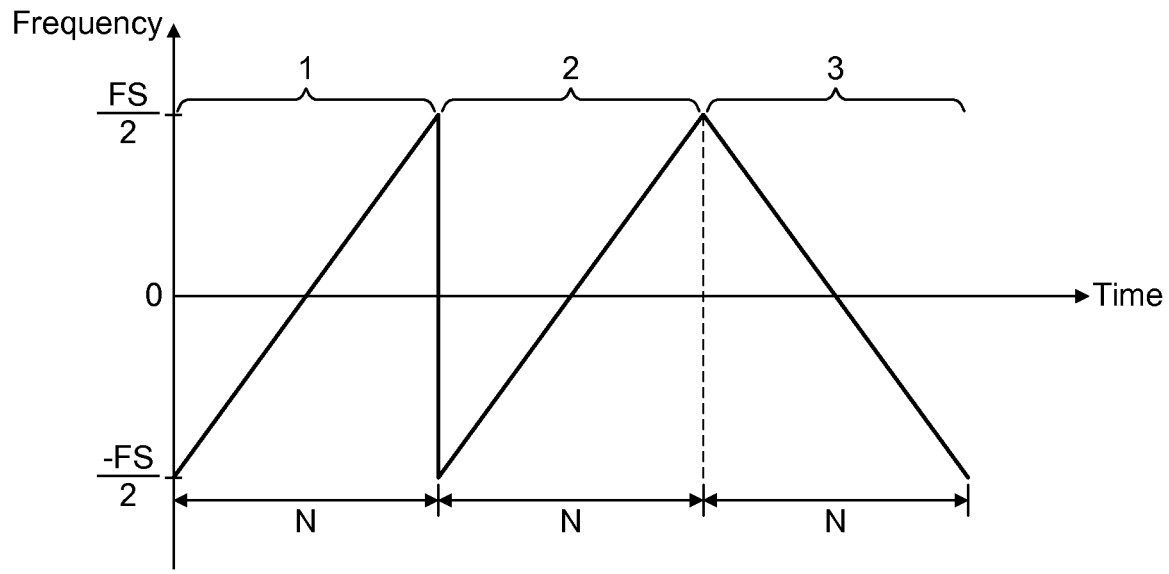
FIG. 1 illustrates a sequence of chirps in the frequency-time plane.
Figure 2:
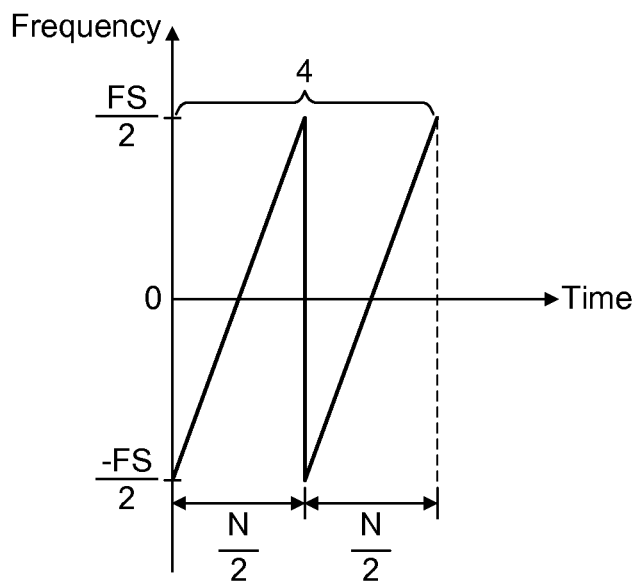
FIG. 2 illustrates a chirp having a gradient of 2 in the frequency-time plane.

This disclosure is directed at a method of receiving chirp signals at a receiver device according to a protocol in which the receiver device knows the gradients of the chirps in the received chirp signal in advance of receiving the chirp signal. Suitably, according to the protocol the receiver device knows the sample rates of the chirps. Suitably, according to the protocol the receiver device knows the number of repeats of each chirp in a symbol of the chirp signal. Suitably, according to the protocol the receiver device knows the frequency hopping sequence or sequences of the chirps in the chirp signal. Suitably, according to the protocol the receiver device also knows the number of samples in each chirp in the received chirp signal. For example, the gradients, the sample rates, the number of repeats and frequency hopping sequence of the chirps and the number of samples in the chirp signal may have been agreed in advance between the transmitter and the receiver. Alternatively, these parameters may have been negotiated using an over-air protocol. Suitably, these parameters may be renegotiated periodically.

Suitably, the receiver device comprises a single correlator for the purpose of detecting the received chirp signal. Alternatively, the receiver device may comprise three or more correlators for the purpose of detecting the received chirp signal. Detecting the received chirp signal means detecting any one or combination of the following properties that the received chirp signal may have or indicate: the gradient of each constituent chirp of the chirp signal, the data encoded in the chirp signal, the frequency offset between the transmitter and the receiver, the time offset between the transmitter and receiver. These properties can be detected by analysing the correlation peaks of the correlator. The correlator described herein is a fixed correlator. This fixed correlator is configured to correlate the chirp signal input to the correlator with a fixed correlating chirp signal. This fixed correlating chirp signal has a fixed gradient. Preferably, the fixed gradient is 1. Alternatively, the fixed gradient is 2. The correlator only outputs a high correlation peak between two chirp signals having the same gradient and same sample phase. The method described herein enables the use of a fixed correlator using a fixed gradient correlating chirp signal by mixing the received chirp signal with a reference chirp signal prior to performing the correlation, such that the signal input to the chirp correlator always has the same gradient as the gradient of the fixed correlating chirp signal. Consequently, there are no registers required to hold a flexible correlating chirp as in the described prior art method. Additionally, the multipliers in the correlator are reduced to simple combinational logic, because the coefficients are known to the synthesis tools at compile time. The fixed correlator approach described herein consumes approximately one sixth the power of the conventional register based approach described.

Figure 3:
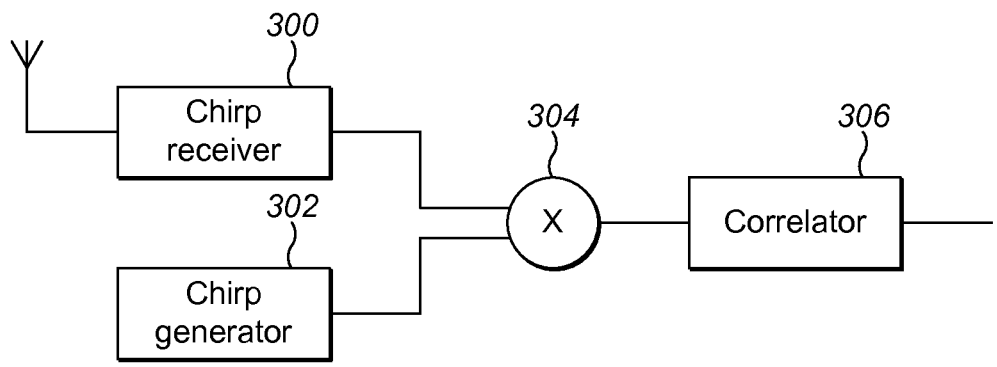
FIG. 3 illustrates a schematic diagram of the exemplary components of a chirp receiver.

FIG. 3 is a schematic diagram showing exemplary components of a receiver device according to the methods described herein. This figure illustrates the layout of the receiver device in terms of functional boxes. The operations of one or more of these functional boxes may be combined in the receiver device or performed by separate components. It will be understood that this figure does not illustrate those conventional components of a receiver device known to a person skilled in the art. A chirp signal having a first gradient g is received at chirp receiver 300. Chirp receiver 300 samples the chirp signal so as to produce a set of samples representing the received signal. Each chirp in the received chirp signal is represented by N samples. One or more identical contiguous chirps representing a data value are collectively called a symbol. In practice, a small timing error may mean that a fraction of a sample may be missing or added to the symbol. One skilled in the art would recognise that this would not adversely affect the operation of the receiver device. Chirp generator 302 generates a reference chirp signal having a second gradient g'. Second gradient g' differs from first gradient g by a fixed value.

Chirp multiplier 304 multiples the reference chirp signal and the received chirp signal so as to form a mixed chirp signal. Suitably, chirp multiplier 304 is a complex multiplier, that multiplies the conjugate of the reference chirp signal with the received chirp signal so as to form a mixed chirp signal. Alternatively, chirp multiplier 304 is a real multiplier that only multiplies the real part of the reference chirp signal with the complex received chirp signal so as to form a mixed chirp signal. In this example, the real chirp multiplier only requires half the number of silicon gates compared to the complex chirp multiplier of the previous example. Use of a real multiplier is useful when handling broadcast signals, where a fixed known gradient is required. A real multiplier is also useful in a system where a programmable correlator is being used or there are several fixed correlators, because the real multiplier is a simpler implementation than the complex multiplier.

In a further example, chirp multiplier 304 multiplies two complex inputs but only the real part of its output is taken. This enables the chirp multiplier to be reduced in size. Additionally, each multiplier in the correlator need only multiply a real value against a complex value, as compared to the previously described examples in which a full complex multiply is performed. This enables the correlator to use about half of the silicon gates used by the correlators associated with the multipliers of the above described examples.

Any combination of these three described examples can also be used for the chirp multiplier 304.

The mixed chirp signal is input to the correlator 306. The correlator 306 correlates the mixed chirp signal with a correlating chirp signal. The correlating chirp signal has the same gradient as the fixed value.

Figure 6:
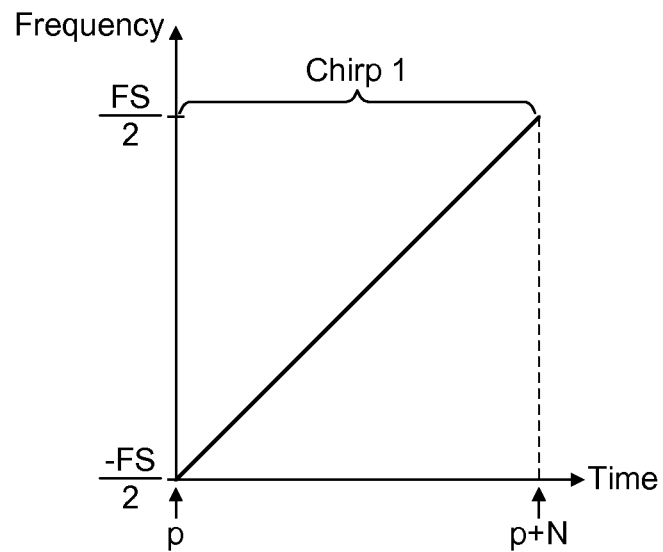
FIG. 6 illustrates encoding data via the starting frequency of a chirp.
Figure 6:
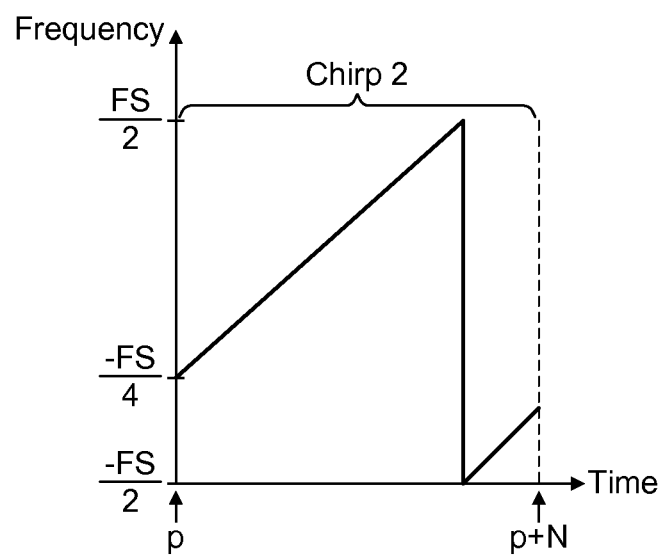

Suitably, the symbol's value p is used to convey data. Suitably, this is achieved by controlling the starting frequency of the one or more chirps in a symbol. Alternatively, this is achieved by evaluating equation 1 using the selected p values. FIG. 6 illustrates the concept of using the symbol value p to convey data by showing two chirps both having unity gradient. Chirp 1 has a starting frequency of $-Fs/2$. The starting sample p of chirp 1 is such that the chirp increases in frequency to $+Fs/2$ over N samples. Chirp 2 has a starting frequency of $-Fs/4$. The starting sample p of chirp 2 is such that the chirp increases in frequency to $+Fs/2$ in less than N samples and then drops down to $-Fs/2$ and returns to $-Fs/4$ after N samples. Two chirps having the same gradient only correlate strongly (i.e. produce a correlation peak) if they also have the same starting frequency. Thus the starting frequency and symbol value p can be detected when a strong peak is output from the correlator. As an example, if there are 256 different possible values p then the detected starting bit could be used to convey 8 bits of data. For example, if p is decimal 10 then this could be interpreted as the 8 bits 00001010. Similarly, if p is 40 then this could be interpreted as the 8 bits 00101000.

Suitably, a further bit is encoded by using an up-chirp or down-chirp to represent a bit, by using the same gradient magnitude but with a different sign. In this case a single fixed correlator having the expected magnitude with a fixed sign can be used to detect either chirp. In this case the mixed chirp signal would be input into correlator 306 twice. In a first pass the mixed chirp signal is input to correlator 306 as previously described. In a second pass the conjugate of the mixed chirp signal is input to the correlator 306. The pass with the largest output peak determines whether the gradient was positive or negative and hence, whether the bit was a one or zero.

Suitably, still further bits are encoded by using a plurality of gradient magnitudes, in addition to their variable signs. In this case, preferably a fixed correlator is used for each possible gradient magnitude. Alternatively the received chirp signal is repeatedly mixed with all possible gradient magnitudes minus one. The gradient whose correlator peak is the largest determines the additional encoded bits.

Figure 4:
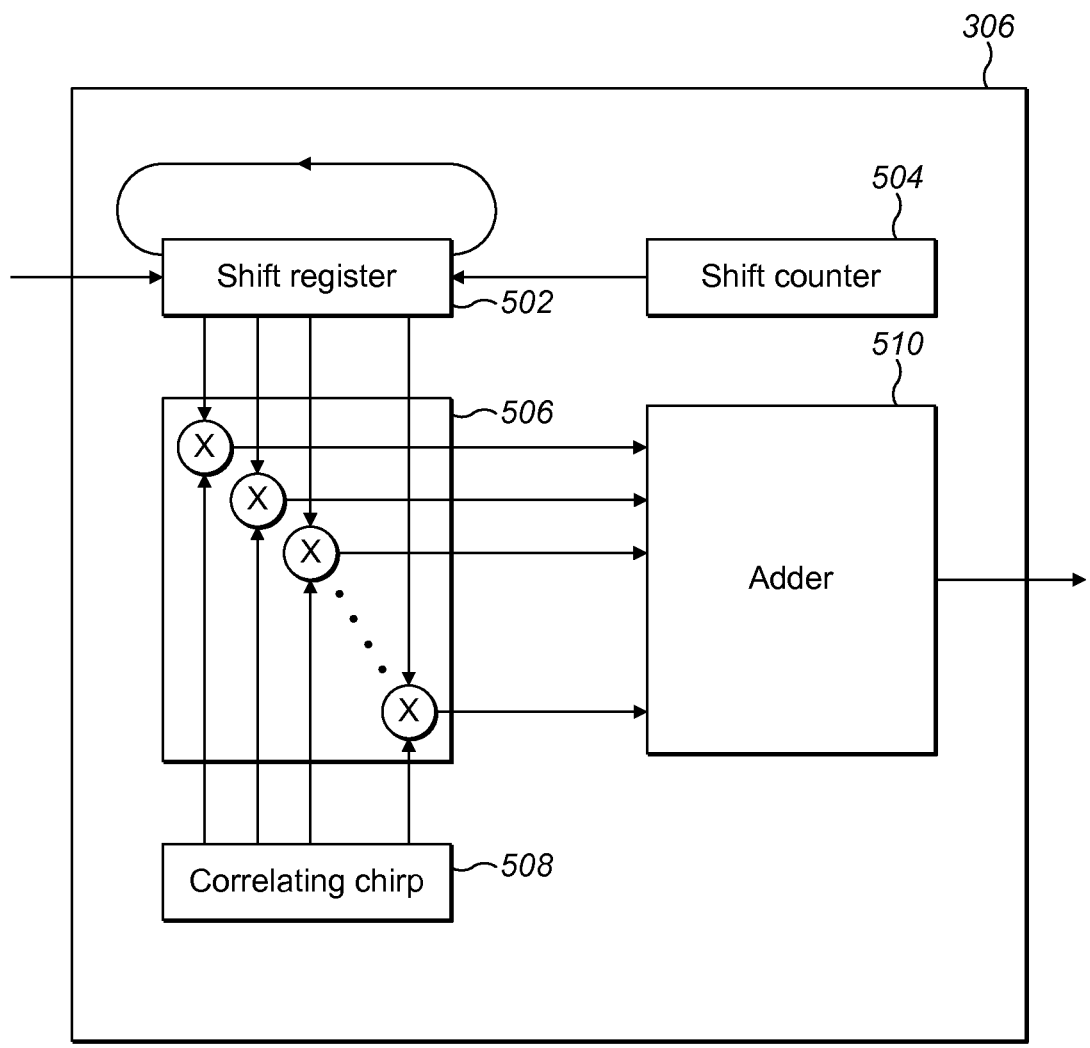
FIG. 4 illustrates a schematic diagram of a chirp correlator.

FIG. 4 illustrates a more detailed view of an exemplary correlator 306. The N samples of the mixed chirp signal output from chirp multiplier 304 are first loaded into N-stage circular shift register 502. The fixed gradient correlating chirp signal consists of one chirp of N samples which are preloaded into correlating chirp module 508. The shift counter 504 is preloaded with the number of shifts, and hence the number of outputs of correlator 306. During normal operation shift counter 504 is preloaded with N, but when using reduced symbol alphabets or if N is non-prime then shift counter 504 could be less than N. The correlator 306 comprises N complex multipliers 506, each taking a complex input from the N-stage circular shift register 502 samples, and the corresponding complex input from the correlating chirp module 508. The output from the N complex multipliers is then summed at adder 510 to yield a single complex correlator sample that is output from the correlator 306. For each successive correlation, the N-stage circular shift register 502 rotates by one. If the sample at the beginning of the N-stage circular shift register is n for one correlation, then the sample at the beginning of the N-stage circular register is n−1 for the next correlation. In this way, the correlator performs a correlation between the fixed gradient correlating chirp and N cyclic phases of the mixed chirp, each consecutive cyclic phase of the mixed chirp cyclically shifted by one sample n.

In an alternative approach, the N-stage circular shift register 502 is rotated by steps greater than one. This allows a smaller symbol set to be selected, where the valid symbols are spaced out around all possible positions of the N-stage circular shift register 502, rather than next to each other. For example, when N=256, a symbol set of 64 would require that the shift register move in steps of 4. This approach has the benefit of tolerating larger timing or frequency offsets before one symbol would be decoded as another one, as each symbol is now spaced further apart. Suitably, the nominal correlation peak positions are searched for in a first pass, by starting the N-stage circular shift register 502 at an expected position, and rotating it by the required step. Under normal conditions this would return a peak quickly and using less power. If no significant peak is found then further passes are made starting progressively further away from the expected position, and continuing with the same step. In this way the peaks can be found using minimal power and computation time.

The N-stage shift register 502 could also shift right-to-left, which would reverse the order of the samples output from the correlator 306, but this would still allow a unique mapping between the transmitted chirp's symbol value and the location of the correlation peak in the correlator output.

The length (i.e. number of samples in a chirp) and gradient of the correlating chirp signal affects the number of correlation peaks that emerge from the correlator 306 and the size of the symbol set that can be used without ambiguity.

In a first example, the number of samples N in each chirp of the received chirp signal is prime. In other words, the length of each chirp is N. Preferably, the gradient of the correlating chirp signal is 1. With an ideal received signal, this generates a single correlation peak, of magnitude N, out of correlator 306 when the gradient of the mixed chirp signal matches the gradient of the correlating chirp signal and when the cyclic shift of the N-stage circular shift register 502 matches the symbol value encoded in the mixed chirp signal. For all other correlator shift offsets the correlator output magnitude is 0. Preferably, the position of the correlation peak in the correlator output is an indication of the value of the received chirp. Optionally, the position of the correlation peak may need to be decoded to obtain its true value.

However, working with non-powers of 2 often leads to inefficiency in the design and implementation of correlators. In a second example, the number of samples N in each chirp of the received chirp signal is non-prime. For example, N may be a power of 2. Powers of two are preferred for digital implementation. Preferably, the gradient of the correlating chirp signal is even. Suitably, the gradient of the correlating chirp signal is 2. Preferably, the symbol value p of the received chirp is even. Suitably, the symbol value p of the received chirp is 2. A consequence of this is that correlator 306 would ordinarily generate 2 correlation peaks, separated by half of the received chirp length N. Since these peaks are essentially the same, the correlator is suitably only cyclically rotated for half of the values in the mixed chirp, i.e. N/2 rotations. A single correlation peak is thereby generated. The position of the correlation peak in the correlator output indicates the symbol value of the received chirp.

For the case that the chirp multiplier 304 is a complex multiplier, correlation peaks have a peak magnitude N, whereas when the shift register 502 is in all other positions the correlator output is 0.

For the case that the chirp multiplier 304 is a real multiplier the matching correlator peak is typically N/2 and in all other positions is about sqrt(N)/2. However, when N is a prime number and g'=g the matching correlator peak is N and in all other positions is 0. And when N is non-prime and g=g'(mod N/2), the matching correlator peak magnitude is N and in all other positions is 0, excluding the g'−1 aliased peaks. Hence, under these circumstances there is no loss in sensitivity compared to the case in which the chirp multiplier 304 is a complex multiplier.

For the case that the chirp multiplier 304 multiplies two complex inputs but only the real part of its output is input to the correlator 306, the matching correlator peak magnitude is typically close to N/2, and sqrt(N)/2 when the shift register 502 is in all other positions. This approach may be less sensitive compared to the complex multiplier or real multiplier examples. However, when N is 100 or more the non-peak values still require a significant amount of noise before a symbol decode error occurs.

Typically, the received chirp signal comprises some noise. If each chirp of the received chirp signal can have any symbol value from the set 0 to N−1, then there are correspondingly N possible peak positions out of correlator 306. In a noisy environment, where the true peak may be surrounded by false peaks, there is a higher chance of picking a false peak and generating a symbol decode error. The probability of error is reduced if the symbol size is reduced. The symbol size is the size of the alphabet that a chirp's value can take. Suitably, the transmitter and receiver negotiate a smaller symbol size. Let this reduced symbol size be Nr. The correlator 306 sets it symbol size by writing Nr into shift counter 504. This sets the number of shifts of shift register 502 and also the number of samples output from correlator 306. Preferably, the encoding of the transmitted symbol of a chirp is such that all Nr symbol values map uniquely onto the first Nr samples out of the correlator 306. Suitably, this is achieved by choosing the function fn appropriately in equation 1. Suitably, Nr is less than N. When Nr is less than N, the chances of picking an incorrect peak are reduced, since there are fewer wrong peaks to choose from. Hence, the probability of a symbol decode error can be adjusted dynamically.

Suitably, the receiver device comprises one correlator. Alternatively, the receiver device comprises a plurality of correlators. Suitably, each of the plurality of correlators is configured to correlate chirps having different symbol lengths. Alternatively, each of the plurality of correlators is configured to correlate chirps having different symbol sizes. Thereby, the receiver device dynamically selects the symbol characteristics depending on the link quality.

Suitably, the gradient of the correlating chirp signal is even and larger than or equal to 2. In this case the number of correlation peaks a full cyclic-correlator would output, Np, is the largest common factor of N and g'. Since, these correlation peaks are repetitions of each other, the correlator needs only be clocked for N/Np samples. N/Np is also the size of the symbol alphabet that this type of chirp can unambiguously communicate. Hence, for a system that has a configurable correlating chirp signal, this method can be used to trade off the symbol size against the decode time and power, for non-prime values of N. These features are valuable in a digital design where flexibility and powers are two are important.

Mathematically, and in the absence of real-world imperfections, such as noise, timing offsets and frequency offsets, the received chirp signal can be represented as:

$$C(g,p)=e^{j\pi g(n-fn(p))(n+1-fn(p))/N} \quad \text{(equation 1)}$$

where g is the gradient of the chirp, N is the number of samples in the sequence, n is a sample in the sequence, p is the symbol's value, fn(p) is a function that encodes p onto the received chirp, which implicitly may also be a function of g, n, N and other constants, and C is the received chirp sequence, which is normally evaluated for all integer values of n from 0 to N−1 in order. The number of valid values of p is the symbol set size, which is nominally N. However, the symbol set size can be more or less than N depending on the quality of the link. The value of g can have any value greater than 0 and less than N. Preferably, g is an integer between 1 and N−1.

In cases where the link quality is good and timing drift is not of significant concern, non-integer values of p are suitably used to increase the data rate beyond the expected log 2(p) bits per symbol. For example, if the symbol set for p is increased from N to 2N symbols, equivalent to an extra bit, then the accuracy of the correlator peak position is established to an accuracy of half a sample. In general, if the symbol set size is increased from N to a*N, then the position accuracy of the correlator output peak is determined to an accuracy of (sample duration)/a. Suitably, the correlator peak position is determined to an accuracy of less than a sample by using a least mean square modelling approach. Suitably, this approach uses two more fixed gradient correlating chirp signals, called the early and late correlating chirp signals, in addition to the single fixed gradient correlating chirp signal already described. In the following discussion the fixed gradient correlating chirp signal previously described is referred to as the prompt correlating chirp signal. All three of these correlating chirp signals are typically embedded within three correlating chirp modules 602 illustrated on FIG. 5. Suitably, the early correlating chirp signal is created by cyclically resampling the prompt correlating chirp signal a fraction of a sample early, and the late correlating chirp signal is created by cyclically resampling the prompt correlating chirp signal a fraction of a sample late. Suitably, these early and late correlating chirp signals are spaced between zero and half of a sample either side of the prompt correlating chirp signal. The optimum position depends on the interpolation method used to obtain the early and late correlating chirp signals. Suitably, a model is generated using all three correlator outputs when subject to a wide range of integer and fractional symbol value offsets and in the presence of different levels of noise and other system imperfections. The model may comprise an optimised parameterised curve. As a simple example, this curve may comprise a suitable sinc function or band-limited symmetrical triangular peak. Both curves may be zero one sample either side of the nominal prompt peak and a value of one at the peak. Alternatively, the model may be statistical. Suitably, either model is created by applying known symbol value offsets to the received chirp signal and noting the respective peak positions from the three correlators. Preferably, these measurements are made in the lab using a complete system that could include imperfections from a radio system. The model aims to generate a good symbol value estimate of an imperfect received chirp signal when presented with the early, prompt and late peaks magnitudes and an estimate of the signal to noise ratio. Suitably, the signal to noise ratio is calculated by dividing the magnitude of the peak by the rms (root mean square) of the other values from the correlator, excluding outliers. The integer and fractional symbol value estimate is scaled up according to the expected symbol size, and then rounded, and is mapped to a detected symbol value. In this approach, the symbol value, encoded in the chirp, is proportional to the correlator's output peak position. Suitably, this is achieved by setting Fn(p)=p/g*v, using the notation from equation 1 and where v is the gradient of the correlating chirp signal. For example, the integer part of p sets a lower bound on the correlator's peak sample position with the next correlator's output sample position setting an upper bound. The fractional part of p sets where a notional peak would lie between the lower and upper bounds if there was to be sufficient resolution. Typically, only the early, prompt and late measurements are available and the model is used to translate these into a symbol decision. This approach is particularly suited to applications where the additional information stored in the fractional component can tolerate small errors. For example, this approach is suitable for transmitting speech samples, where the extra information in a good link would improve the fidelity of the speech. As the link deteriorates the speech quality would degrade accordingly.

In an alternative approach, only a single prompt correlator is used. The early and late samples are instead taken from either side of the prompt correlator peak sample, rather than from dedicated correlators. This is equivalent to having an early and late correlator spaced a whole sample away from the prompt sample, but otherwise uses the same approach to that previously described. This approach uses fewer gates but may be less accurate.

In a further approach, rather than using early and late correlators, a single fixed correlator is used. The received chirp signal is passed through chirp multiplier 304 and chirp correlator 306 three times, to generate early, prompt and late correlation results. Chirp generator 302 creates the early and late reference chirp signals using equation 1, with Fn(p)=−t/g' and Fn(p)=+t/g' respectively. t is typically between ⅓ and ½. The gradient is set the same as that of the prompt reference chirp signal. The early, late and prompt correlator results are used to create a model as previously described. This model is used to convert early, prompt and late, peak position measurements into a symbol value as previously described. This approach has advantages in terms of performance and reduced gate counts compared to the three correlator approach. However, it may require more clock cycles and power.

Mathematically, the generated reference chirp signal can be represented as:

$$R(g') = e^{j\pi g'n(n+1)/N} \quad \text{(equation 2)}$$

where R is the generated reference chirp, g' is the gradient, N is the number of samples in the sequence, n is a sample in the sequence, and p is the sample at the beginning of the sequence. The generated reference chirp is normally evaluated for integer values of n from 0 to N−1 in order. g' can have any value between 0 and N−1. Preferably, g' is an integer.

$$g - g' = v \quad \text{(equation 3)}$$

where v is the fixed value.

This fixed value is the same as the gradient of the correlating chirp signal used by the correlator. Mathematically, the correlating chirp signal can be represented as:

$$CO(v) = e^{j\pi v n(n+1)/N} \quad \text{(equation 4)}$$

where CO is the correlating chirp, v is the gradient, N is the number of samples in the sequence and n is a sample in the sequence. The correlating chirp is normally evaluated for integer values of n from 0 to N−1 in order. v can have any value greater than 0 and less than N. Preferably, v is an integer.

Preferably, the fixed value v is 1. Other values of v have uses when the received chirp length is not prime or if the symbol size is to be reduced.

Preferably, the chirp multiplier multiplies the reference chirp signal and the received chirp signal by performing a multiplication of the two signals. For example, the chirp multiplier multiplies the received chirp signal C(g, p) with the complex conjugate of the generated reference chirp signal R(g')*. Mathematically:

$$M = C(g,p)R(g')^*$$

$$M = e^{j\pi(g-g')n(n+1)/N}$$

$$M = e^{j\pi v n(n+1)/N} \quad \text{(equation 5)}$$

where M is the mixed chirp signal, v is the gradient, N is the number of samples in the sequence, n is a sample in the sequence, and p is the value of the received chirp signal. In this example Fn(p) is assumed to be zero for all p.

In the preferred example in which v=1, the mixed chirp signal has a gradient of unity.

In a preferred example implementation, the chirp signals are represented by equation 1 with the extra limitation that N is a prime number. Alternatively, the chirp signals are represented by equation 1 with the extra limitation that N is not a prime number and v, p and g' are selected as previously described. In either case, two codes having the same gradient g but different values p are orthogonal. The correlator correlates all cyclic phases of the mixed chirp signal with the fixed gradient correlating chirp signal. This generates N output samples from the correlator. The correlation peak of magnitude N results when the correlator correlates a cyclic phase of the mixed chirp with a correlating chirp having the same gradient and start phase. When a correlator correlates a cyclic phase of the mixed chirp with a correlating chirp having the same gradient but a different start phase, an output of 0 results. Codes having different gradients are semi-orthogonal. When a normalized output correlator correlates a mixed chirp with a correlating chirp having a different gradient, with any start phase, a correlation of approximately $\sqrt{N}$ results. This has the approximately the same rms power as if the transmitter had transmitted random noise at the same power as the chirp signal.

Chirp receiver 300 receives an input chirp signal from a transmitter and outputs a series of samples that represent a chirp symbol. When the start and end times of the symbol are aligned with the edges of the input chirp signal, chirp receiver 300 is synchronised. Typically, differences in the crystal frequencies between the transmitter and receiver can cause their relative frequencies to drift. If left unattended these frequency differences are integrated and cause the start and end timings of the symbol to drift, one way or another. It is clear that a drift of a half a sample or more, in either direction, will likely cause a symbol decoding error. Suitably, these frequency and timing errors are tracked before the start and end timings of the symbol drift.

In existing systems that use the magnitude of correlation peaks for tracking, the signal is oversampled, which gives rise to multiple samples near the peak. In an oversampled and synchronised system the peak sample is usually well defined and sits centrally between two equally valued samples typically called the early and late values. Typically these early and late values have a magnitude of about half the peak value. A phase locked loop typically drives a frequency correction circuit using the difference in magnitude between the early and late samples. The phase locked loop aims to drive the early and late values to be equal. In doing so it corrects for the frequency offset between the transmitter and the receiver, which in turn halts the timing drift that would otherwise occur.

Oversampling the signal is not desirable in chirp receiver 300, which uses cyclic chirp signals, because the correlation mechanism relies on frequency aliasing within Fs Hz for effect. Sampling at a rate higher than Fs may lead to the correlation and mixing functions ceasing to behave as expected. If oversampling is not used then the magnitude of the correlation peak from correlator 306 only has a single sample at its peak. The equivalent early and late samples are 2/Fs apart and in a noise free synchronised system are exactly zero. Should a small frequency or timing offset occur that would cause the peak to move slightly, the early and late samples can only become positive, since they were both at zero. Hence, the difference between them will not be a good indication of the timing error.

Preferably, intermediate outputs from fixed correlator 306 are generated.

Figure 5:
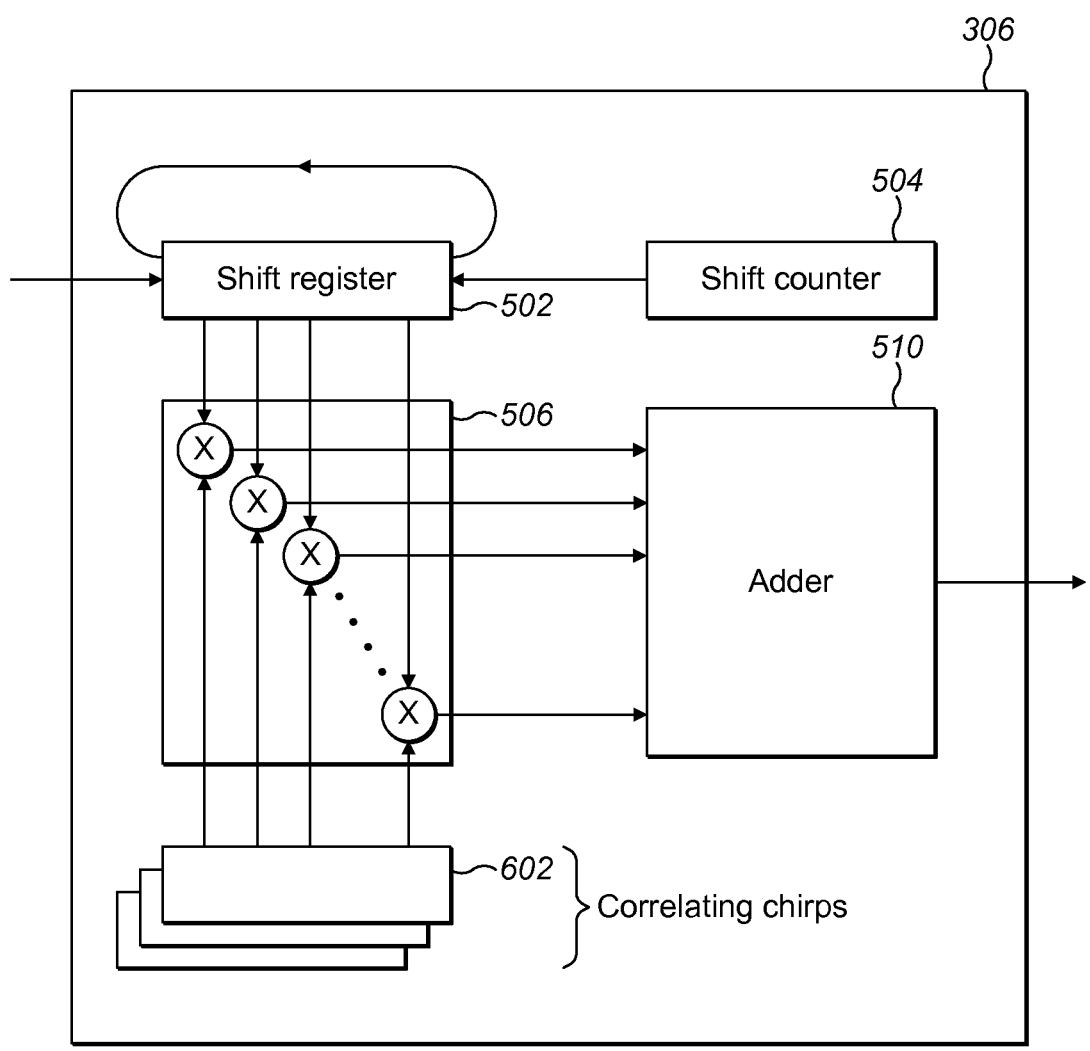
FIG. 5 illustrates a schematic diagram of a chirp correlator adapted compared to that of FIG. 4.

Suitably, the correlator is further modified to correlate the mixed chirp signal with a correlating chirp signal offset from the expected time interval of the received chirp signal such that it is later than the expected time interval, and also to correlate the mixed chirp signal with a correlating chirp signal offset from the expected time interval such that it is earlier than the expected time interval. Using this method, if the relative timing of the transmitter and receiver clocks starts to drift, this drift will be picked up by the mixed chirp signal correlating more strongly with one of the offset correlating chirp signals than the correlating chirp signal at the expected time interval. The time synchronisation is therefore updated to the timing of the offset correlating chirp signal that the mixed chirp signal correlated more strongly with. Hence synchronisation is maintained. FIG. 5 depicts the modification to the correlator 306 of FIG. 4 suitable for performing the described adaption. The correlator of FIG. 5 is the same as that of FIG. 4 with the exception that it comprises three fixed correlator registers instead of one. These registers respectively contain early, prompt and late correlating chirp signal for correlating with the mixed chirp signal in the N-stage circular shift register. Preferably, the peak positions and magnitudes from all three correlators and the peaks magnitudes g samples, (where g is the gradient of the received chirp signal), either side of all three peaks are used to determine the time offset. Suitably, a model is created by applying known fractional timing offsets to the received chirp signal and noting the measured respective positions of all nine peaks. Suitably, the model is updated so that in the presence of the nine measured peaks, and in the presence of imperfections, such as noise, a good approximation to the actual received chirp signal timing offset is made. Suitably, the model is optimised using a complete system with real world imperfections including noise.

Figure 7:
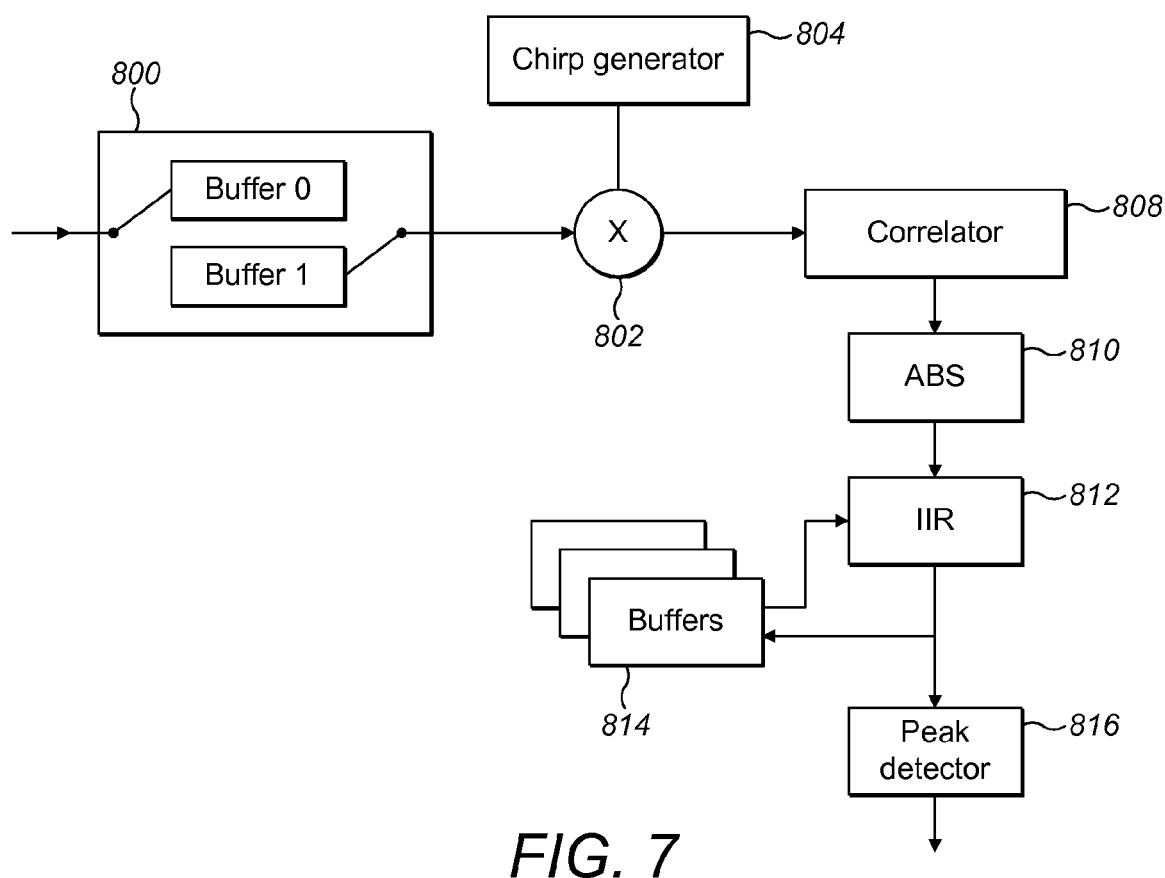
FIG. 7 illustrates a schematic diagram of the exemplary components of a further chirp receiver.

FIG. 7 illustrates an exemplary receiver device. A chirp signal is received at the receiver device and the samples of a received chirp of the chirp signal are input to buffer module 800. Buffer module 800 comprises two buffers. This enables an input buffer to be receiving samples whilst an output buffer is being read. When the input buffer becomes full the two buffers are swapped over so that input samples can continue to be sampled and stored without loss. If one of a set of chirp gradients are expected, for example when decoding additional symbol bits by using $2^K$ gradients to represent K bits of additional information, or when wanting to communicate with one of a number of devices with different predefined gradients, then the output buffer may be read multiple times, once for each possible gradient. With suitably fast digital processing clock rates these buffers can provide a means to decode and track received chirps in real time. The received chirp samples output from the buffer module 800 are input to chirp multiplier 802. The chirp multiplier 802 multiplies the received chirp with a reference chirp signal generated by chirp generator 804 as previously described. The mixed chirp output from the chirp multiplier 802 is input to correlator 808 which operates as previously described. Suitably, the output of the correlator is input to an absolute value module 810. The absolute value module returns the magnitude of the complex input signal from the correlator. Suitably, the output of absolute value module 810 is input to an integrator 812. In some transmitter receiver configurations the received chirp signal comprises a set of individual chirps which are all identical, i.e. they have the same gradient and symbol value. The integrator is configured to integrate the corresponding correlator outputs of each of the individual chirps. So, for example, the integrator integrates the correlator output of each individual chirp for the case when the N-stage circular shift register is in the position s=1. Similarly, the integrator integrates the correlator output of each individual chirp for the case when the N-stage circular shift register is in the position s=2, and so on. The integrator performs the integration by storing the N samples of the correlator output for a specific s position of the first chirp in the set in the buffers 814. It then retrieves these stored N samples from buffers 814 and performs an average of them with the N samples of the corresponding correlator output of the second chirp in the set. It then stores this averaged output in the buffers 814. It then retrieves these stored N samples from buffers 814 and performs an average of them with the N samples of the corresponding correlator output from the third chirp in the set. The iteration continues until all the chirps in the chirp set have been integrated. This integration technique is non-coherent integration. In one approach all the samples from repeated chirps are stored in memory, before an average is performed. Alternatively, if memory is limited the integrator might perform the average using N IIR (infinite impulse response) filters, with coefficients suitably chosen for the expected number of identical chirps in a symbol.

In an alternative implementation, the receiver device of FIG. 7 may be modified such that the absolute value module 810 is after the integrator 812. In this case the integrator 812 is a complex integrator. In this case the integration technique is coherent integration.

This integrated output results in more accurate correlation peak detection, which is performed in peak detection module 816.

Any of the example receivers described herein may be incorporated into a transceiver which also includes a transmitter. In such a transceiver, the chirp generator 302 suitably generates chirps to be transmitted in addition to generating reference chirps to be mixed with received chirps.

Suitably, the receiver described herein is implemented in a system operating according to Bluetooth protocols. Suitably, the transceiver described herein is implemented in a system operating according to Bluetooth protocols.

Preferably, the receiver and transceiver described herein are implemented in hardware. Alternatively, the receiver and transceiver described herein may be implemented in software.

Suitably, the receiver and/or transceiver described herein are implemented in long range radio communications. In a typical transmitter the chirps are converted into an analogue form and mixed up to RF frequencies before being transmitted. In a typical receiver the chirps are mixed from RF down to base band and are quantised prior to decoding. Typically, chirps are used for implementations that use a low data rate and low power. The receiver and/or transceiver are suitable for use in high-sensitivity radio communications. Example implementations of the receiver and/or transceiver are in a temperature sensor, a walkie talkie or a wireless headset.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A method for receiving a chirp signal at a receiver device according to a protocol in which the chirp signal has a gradient known to the receiver device, the method comprising:
   receiving the chirp signal having a first gradient g;
   generating a reference chirp signal having a second gradient g', wherein the second gradient g' differs from the first gradient g by a fixed value v;
   multiplying the reference chirp signal and the received chirp signal so as to form a mixed chirp signal; and
   detecting the received chirp signal by cyclically correlating the mixed chirp signal with a fixed gradient correlating chirp signal.

2. A method as claimed in claim 1, wherein the detecting step further comprises identifying at least one correlation peak position.

3. A method as claimed in claim 1, wherein g'=g−1 and the fixed gradient correlating chirp signal has a gradient of 1.

4. A method as claimed in claim 1, wherein the chirp signal is represented by a symbol having a sequence of N samples and N is an integer greater than one.

5. A method as claimed in claim 4, wherein N is a prime number.

6. A method as claimed in claim 1, wherein g' is an even number and v is an even number.

7. A method as claimed in claim 1, wherein the reference chirp signal is real and not complex.

8. A method as claimed in claim 1, wherein the mixed chirp signal is real and not complex.

9. A method as claimed in claim 4, wherein the chirp signal comprises one or more chirps, wherein the detecting step further comprises correlating a fixed gradient correlating chirp of the fixed gradient correlating chirp signal with each of N cyclic phases of a mixed chirp of the mixed chirp signal, each consecutive cyclic phase of the mixed chirp is cyclically shifted by one sample of the sequence of N samples.

10. A receiver device for receiving a chirp signal according to a protocol in which the chirp signal has a gradient known to the receiver device, the receiver device comprising:
    a receiver configured to receive the chirp signal having a first gradient g;
    a chirp generator configured to generate a reference chirp signal having a second gradient g', wherein the second gradient g' differs from the first gradient g by a fixed value v;
    a chirp multiplier configured to multiply the reference chirp signal and the received chirp signal so as to form a mixed chirp signal; and
    a cyclical correlator configured to detect the received chirp signal by cyclically correlating the mixed chirp signal with a fixed gradient correlating chirp signal.

11. A receiver device as claimed in claim 10, further comprising a correlation peak detector configured to identify at least one correlation peak position.

12. A receiver device as claimed in claim 10, wherein g'=g−1 and the fixed gradient correlating chirp signal has a gradient of 1.

13. A receiver device as claimed in claim 10, wherein the chirp signal is represented by a symbol having a repeating sequence of N samples and N is an integer greater than one.

14. A receiver device as claimed in claim 13, wherein N is a prime number.

15. A receiver device as claimed in claim 10, wherein g' is an even number and v is an even number.

16. A receiver device as claimed in claim 10, wherein the reference chirp signal is real and not complex.

17. A receiver device as claimed in claim 10, wherein the mixed chirp signal is real and not complex.

18. A transceiver device including the receiver device of claim 10 and a transmitter device, wherein the chirp generator is further configured to generate a second chirp signal to be transmitted by the transmitter device.

* * * * *